United States Patent
Wu

(10) Patent No.: US 8,361,434 B2
(45) Date of Patent: Jan. 29, 2013

(54) EXTRA MESOPOROUS Y ZEOLITE

(75) Inventor: Jason Wu, Clinton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 653 days.

(21) Appl. No.: 12/584,376

(22) Filed: Sep. 4, 2009

(65) Prior Publication Data

US 2010/0065477 A1    Mar. 18, 2010

Related U.S. Application Data

(60) Provisional application No. 61/192,391, filed on Sep. 18, 2008.

(51) Int. Cl.
*C01B 39/24* (2006.01)
*B01J 29/08* (2006.01)
*B01J 21/08* (2006.01)
*B01J 21/04* (2006.01)

(52) U.S. Cl. ............ 423/700; 502/79; 502/73; 502/64

(58) Field of Classification Search .......... 423/700, 423/713

See application file for complete search history.

(56) References Cited

U.S. PATENT DOCUMENTS

| | | |
|---|---|---|
| 3,375,065 A | 3/1968 | McDaniel et al. |
| 5,069,890 A | 12/1991 | Dai et al. |
| 5,087,348 A | 2/1992 | Dai et al. |
| 5,354,452 A | 10/1994 | Dai et al. |
| 5,534,135 A | 7/1996 | Dai et al. |
| 5,601,798 A * | 2/1997 | Cooper et al. ............ 423/700 |

FOREIGN PATENT DOCUMENTS

| | | |
|---|---|---|
| EP | 1 882 676 A1 | 1/2008 |
| EP | 1 938 898 A1 | 7/2008 |
| WO | WO 2004/050548 A2 | 6/2004 |
| WO | WO 2009/062742 A1 | 5/2009 |

OTHER PUBLICATIONS

J. Weitkamp & L. Puppe, Catalysis and Zeolites: Fundamentals and Applications (Spring 1999, 141, 460).*
Andries H. Janssen, Abraham J. Koster, Krijn P. De Jong; "Three-Dimensional Transmission Electron Microscopy Observations of Mesopores in Dealuminated Zeolite Y," Angew. Chem. Int. Ed 2001, 40 (6), 1102-1104.
Koichi Sato, Yoichi, Nishimura, Nobuyuki Matsubayashi, Motoyasu Imamura, Hiromichi Shimada; "Structural changes of Y zeolites during ion exchange treatment: effects of Si/Al ratio of the starting NaY," Microporous and Mesoporous Materials, 59 (2003), 133-146.
A. H. Janssen, A. J. Koster, K. P. De Jong; "On the Shape of the Mesopores in Zeolite Y: A Three-Dimensional Transmission Electron Microscopy Study Combined with Texture Analysis," J. Phys. Chem. B, 2002, 106, pp. 11905-11909.
L. Teyssier, M. Thomas, C. Bouchy, J.A. Martens, E. Guillon; "Liquid chomatrography method for quantification of surface connected mesoporosity in ultrastable Y zeolites," Microporous and Mesoporous Materials 100 (2007) pp. 6-11.

* cited by examiner

*Primary Examiner* — Walter D Griffin
*Assistant Examiner* — Derek Mueller
(74) *Attorney, Agent, or Firm* — Bruce M. Bordelon

(57) ABSTRACT

This invention relates to the composition and synthesis of an Extra Mesoporous Y (or "EMY") zeolite and its use in the catalytic conversion of organic compounds. In particular, this invention relates to a Y-type framework zeolite possessing a high large mesopore pore volume to small mesopore pore volume ratio. The novel zeolite obtained provides beneficial structural features for use in petroleum refining and petrochemical processes.

10 Claims, 10 Drawing Sheets

EXTRA MESOPOROUS Y ZEOLITE

This application claims the benefit of U.S. Provisional Application No. 61/192,391 filed Sep. 18, 2008.

FIELD OF THE INVENTION

This invention relates to the composition and synthesis of an Extra Mesoporous Y ("EMY") zeolite and its use in the catalytic conversion of organic compounds.

BACKGROUND

Zeolitic materials, both natural and synthetic, have been demonstrated in the past to have utility as adsorbent materials and to have catalytic properties for various types of hydrocarbon conversion reactions. Certain zeolitic materials are ordered, porous crystalline metallosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ tetrahedra and optionally tetrahedra of a Periodic Table Group IIIA element oxide, e.g., $AlO_4$, in which the tetrahedra are cross-linked by the sharing of oxygen atoms whereby the ratio of the total Group IIIA element and silicon atoms to oxygen atoms is 1:2. The electrovalence of the tetrahedra containing the Group IIIA element is balanced by the inclusion in the crystal of a cation, for example an alkali metal or an alkaline earth metal cation. This can be expressed wherein the ratio of the Group IIIA element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449), zeolite ZSM-20 (U.S. Pat. No. 3,972,983); ZSM-35 (U.S. Pat. No. 4,016,245); zeolite ZSM-23 (U.S. Pat. No. 4,076,842); zeolite MCM-22 (U.S. Pat. No. 4,954,325); and zeolite MCM-35 (U.S. Pat. No. 4,981,663), merely to name a few.

Type "Y" zeolites are of the faujasite ("FAU") framework type which is described in *Atlas of Zeolitic Framework Types* (Ch. Baerlocher, W. M. Meier, and D. H. Olson editors, 5th Rev. Ed., Elsevier Science B. V., 2001) and in the pure crystalline form are comprised of three-dimensional channels of 12-membered rings. The crystalline zeolite Y is described in U.S. Pat. No. 3,130,007. Zeolite Y and improved Y-type zeolites such as Ultra Stable Y ("USY" or "US-Y") (U.S. Pat. No. 3,375,065) not only provide a desired framework for shape selective reactions but also exhibit exceptional stability in the presence of steam at elevated temperatures which has resulted in this zeolite structure being utilized in many catalytic petroleum refining and petrochemical processes. Additionally, the three-dimensional pore channel structure of the faujasite framework zeolites, such as the Y-type zeolites, in combination with their relatively good ability to retain a high surface area under severe hydrothermal conditions and their generally low cost to manufacture makes these zeolites a preferred component for Fluid Catalytic Cracking ("FCC") catalysts in petroleum refining and petrochemical processes.

In a pure zeolite crystal, the pore diameters are typically in the range of a few angstroms in diameter. Y-type zeolites exhibit pore diameters of about 7.4 Angstroms (Å) in the pure crystal form. However, in manufacture, defects in the crystalline structure and in particular in the inter-crystal interfaces occur in the crystalline structure of zeolites, including the Y-type zeolites. Additionally, due to certain methods of preparations and/or use, both wanted and unwanted structural modifications can be made to the zeolite crystal. It is these "defects" which lead to specific properties of the zeolite which may have beneficial properties when utilized in catalytic processes.

The conventional Ultra Stable Y (USY) zeolites prepared by mild steam calcination, as taught by U.S. Pat. No. 3,375,065, contains mesopores in the 30 to 50 Å regions. Pores with pore diameters in the 30 to 50 Å range are herein defined as "Small Mesopores". Another type of Y zeolite stabilization utilizes chemical processes to remove framework aluminum atoms. One example of Y zeolites obtained from such processes is LZ-210 (U.S. Pat. No. 4,711,770). In LZ-210, the vacancies of removed aluminum atoms are replaced by silicon atoms, therefore preserving nearly perfect crystal structure of Y zeolite with very little formation of mesopores. In FCC applications, however, such perfect Y zeolite, i.e., without mesopores, leads to low conversions of heavy hydrocarbons. As the FCC feed stream is getting heavier, it is more desirable to have a zeolite with more mesopores in the large mesoporous region. Here we define "Large Mesopores" as pores with pore diameter in the greater than 50 to 500 Å regions. It is believed that zeolites with large mesopores can enhance conversions of heavy hydrocarbons. A problem that exists in the industry is that many Y-type zeolites (e.g., Na—Y zeolites), while widely used in the industry, exhibit a "peak" in the small mesopore range (30 to 50 Å pore diameters) while exhibiting no significant pore volume associated with the large mesopore range (50 to 500 Å pore diameters). Conversely, other Y-type zeolites (e.g., USY zeolites), exhibit a significant "peak" in the small mesopore range (30 to 50 Å pore diameters) when some large mesopores are present.

Therefore, what is needed in the art is an improved Y-type zeolite which possesses an improved large mesoporous volume to small mesoporous volume ratio structure while suppressing the magnitude of the "small mesopore peak" associated with pores measured in the small mesopore range (30 to 50 Å pore diameters)

SUMMARY

The present invention includes an extra mesoporous Y zeolite (termed herein as "EMY" zeolite) which has improved mesoporous properties over Y zeolites of the prior art, as well as a method of making the zeolite and its use in catalytic hydrocarbon processing.

One embodiment of the present invention is a Y zeolite comprising a Large Mesopore Volume of at least about 0.03 cm³/g and a Small Mesopore Peak of less than about 0.15 cm³/g. In a preferred embodiment, the zeolite has a unit cell size from about 24.37 Angstroms to about 24.47 Angstroms. In an even more preferred embodiment, the zeolite has a Large-to-Small Pore Volume Ratio of at least about 4.0. Definitions of these terms are provided herein.

In a preferred embodiment of the present invention, the values for the Large Mesopore Volume of the zeolite and the Small Mesopore Peak of the zeolite above are measured in the as-fabricated zeolite (i.e., the zeolite obtained after high temperature steam calcining). In even more preferred embodiments, the zeolite of the present invention has a Large-to-Small Pore Volume Ratio of at least about 5.0, a Small Mesopore Peak of less than about 0.13 cm³/g, and a Large Mesopore Volume of at least 0.05 cm³/g.

Additionally, in a preferred embodiment of the present invention is a method of making an extra mesoporous zeolite, comprising:

a) ammonium exchanging a Na—Y zeolite to obtain a zeolite precursor with a Na₂O content from about 2 to about 5 wt %; and b) subjecting the precursor to a high temperature steam calcination at a temperature from about 1200° F. to about 1500° F. wherein the temperature of the zeolite precursor is within 50° F. of the high temperature steam calcination temperature in less than 5 minutes;

wherein the zeolite has a Large Mesopore Volume of at least about 0.03 cm³/g, and a Small Mesopore Peak of less than about 0.15 cm³/g.

In other preferred embodiments of the method of making, the Na₂O content of the zeolite precursor is held to within from about 2.2 to about 4 wt % on a dry basis. In other preferred embodiments, the temperature of the zeolite precursor during the high temperature steam calcination step is brought within 50° F. of the high temperature steam calcination temperature in less than 2 minutes.

Additionally, in a preferred embodiment of the present invention is a process for using an extra mesoporous zeolite for conversion of a hydrocarbon-containing stream, comprising:

a) contacting the hydrocarbon-containing feedstream with a Y zeolite in a petroleum refining process; and b) producing at least one product stream which has a lower average molecular weight than the hydrocarbon-containing feedstream;

wherein the zeolite has a Large Mesopore Volume of at least about 0.03 cm³/g, and a Small Mesopore Peak of less than about 0.15 cm³/g.

In preferred embodiments, the petroleum refining process is selected from a catalytic cracking process, a fluidized catalytic cracking process, a hydrocracking process, a hydrodesulfurization process, a reforming process, an alkylation process, an oligomerization process, a dewaxing process, and an isomerization process.

DETAILED DESCRIPTION OF THE EMBODIMENTS

Figure 1:
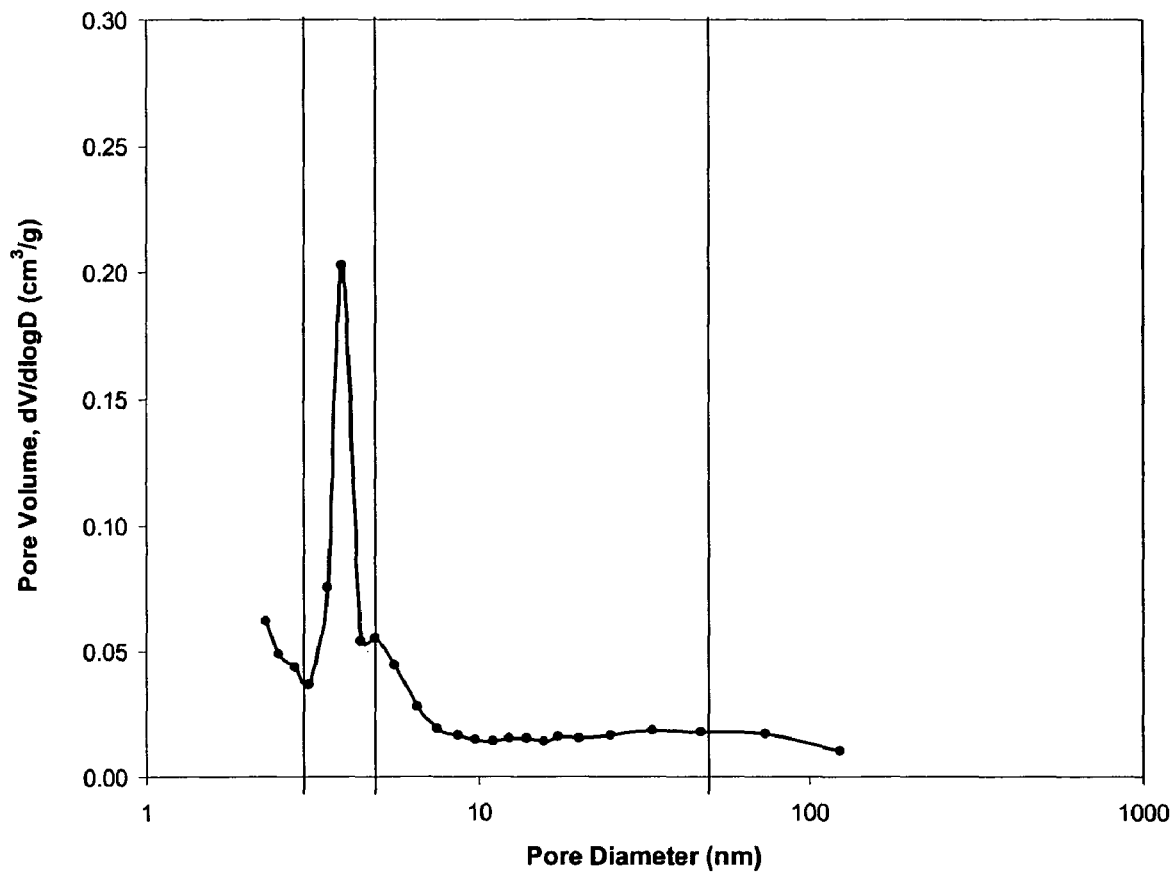
FIG. 1 is a BJH N₂ Desorption Plot of a USY zeolite from a commercially available ammonium-Y zeolite.

The Extra Mesoporous Y ("EMY") zeolite of the present invention produces a Y-type zeolite with a suppressed "small mesopore peak" that is commonly found associated with in the "small mesopores" (30 to 50 Å pore diameters) of commercial Y-type zeolites, while maintaining a substantial volume of pores in the "large mesopores" (greater than 50 to 500 Å pore diameters) of the zeolite. International Union of Pure and Applied Chemistry ("IUPAC") standards defines "mesopores" as having pore diameters greater than 20 to less than 500 Angstroms (Å). However, the standard nitrogen desorption measurements as used herein do not provide pore volume data below about 22 Å. Additionally, since the "small mesopore peak" found in Y zeolites are substantially confined between the 30 and 50 Å ranges, it is sufficient to define the measurable mesoporous pore diameter range for the purposes of this invention as pore diameters from 30 to 500 Angstroms (Å).

Therefore, as utilized herein, the terms "Small Mesopore(s)" or "Small Mesoporous" are defined as those pore structures in the zeolite crystal with a pore diameter of 30 to 50 Angstroms (Å). Similarly, the terms "Large Mesopore(s)" or "Large Mesoporous" as utilized herein are defined as those pore structures in the zeolite crystal with a pore diameter of greater than 50 to 500 Angstroms (Å). The terms "Mesopore(s)" or "Mesoporous" when utilized herein alone (i.e., not in conjunction with a "small" or "large" adjective) are defined herein as those pore structures in the zeolite crystal with a pore diameter of 30 to 500 Angstroms (Å). Unless otherwise noted, the unit of measurement used for mesoporous pore diameters herein is in Angstroms (Å).

The term "Small Mesopore Volume" or "Small Mesoporous Volume" of a material as used herein is defined as the total pore volume of the pores per unit mass in the Small Mesopore range as measured and calculated by ASTM Standard D 4222 "Determination of Nitrogen Adsorption and Desorption Isotherms of Catalysts and Catalyst Carriers by Static Volumetric Measurements"; ASTM Standard D 4641 "Calculation of Pore Size Distributions of Catalysts from Nitrogen Desorption Isotherms"; and "The Determination of Pore Volume and Area Distributions in Porous Substances, I. Computations from Nitrogen Isotherms", by Barrett, E. P.; Joyner, L. S.; and Halenda, P. P.; *Journal of American Chemical Society*; vol. 73, pp. 373-380 (1951), all of which are incorporated herein by reference. Unless otherwise noted, the unit of measurement for mesopore volume is in $cm^3/g$.

The term "Large Mesopore Volume" or "Large Mesoporous Volume" of a material as used herein is defined as the total pore volume of the pores per unit mass in the Large Mesopore range as measured and calculated by ASTM Standard D 4222 "Determination of Nitrogen Adsorption and Desorption Isotherms of Catalysts and Catalyst Carriers by Static Volumetric Measurements"; ASTM Standard D 4641 "Calculation of Pore Size Distributions of Catalysts from Nitrogen Desorption Isotherms"; and "The Determination of Pore Volume and Area Distributions in Porous Substances, I. Computations from Nitrogen Isotherms", by Barrett, E. P.; Joyner, L. S.; and Halenda, P. P.; *J. Amer. Chem. Soc.*; vol. 73, pp. 373-380 (1951). Unless otherwise noted, the unit of measurement for mesopore volume is in $cm^3/g$.

The term "Large-to-Small Pore Volume Ratio" or "LSPVR" of a material as used herein is defined as the ratio of the Large Mesopore Volume to the Small Mesopore Volume (dimensionless).

The term "BJH $N_2$ Desorption Plot" as used herein is defined as a plot of the change in unit volume of a mesoporous material as a function of the pore diameter of the mesoporous material. Herein, the "BJH $N_2$ Desorption Plot" is shown as the pore volume calculated as dV/dlogD (in $cm^3/g$) vs. the pore diameter (in nanometers) as determined by the ASTM Standard D 4222, ASTM Standard D 4641, and "The Determination of Pore Volume and Area Distributions in Porous Substances, I. Computations from Nitrogen Isotherms", by Barrett, E. P.; Joyner, L. S.; and Halenda, P. P.; *Journal of American Chemical Society*; vol. 73, pp. 373-380 (1951), (i.e., the "BJH method" for calculating the pore distribution of a porous substance) as referenced in the definitions above. The BJH $N_2$ Desorption Plot should be generated from approximately 15 to 30 data points at approximately equidistant positions on a logarithmic x-axis of the pore diameter (nanometers) between the values of 3 to 50 nanometers (30 to 500 Å). The pore volume value on the y-axis of the plot is commonly calculated in industry equipment as an interpolated value of the incremental change in volume, dV (where V is in $cm^3$, and dV is in $cm^3$) divided by the incremental change in the log of the pore diameter, dlogD (where D is in nanometers, and dlogD is unitless) and is adjusted to the unit weight of the sample in grams. Therefore, the "pore volume" (which is the common term utilized in the industry) as shown on the y-axis of the BJH $N_2$ Desorption Plot may be more appropriately described as an incremental pore volume per unit mass and is expressed herein in the units $cm^3/g$. It should be noted that the "pore volume" value on the y-axis of the BJH $N_2$ Desorption Plot is not synonymous with the "Small Mesopore Volume" and "Large Mesopore Volume" as described above which are calculated unit pore volumes over a range of pore diameters. However, these calculations and terms as used herein are familiar to those of skill in the art. All measurements and data plots as utilized herein were made with a Micromeritics® Tristar 3000® analyzer.

The term "Small Mesopore Peak" for a material as used herein is defined as the maximum pore volume value calculated as dV/dlogD (y-axis) on a BJH $N_2$ Desorption Plot as described above (pore volume vs. pore diameter) between the 30 Å and 50 Å pore diameter range (x-axis). Unless otherwise noted, the unit of measurement for the small mesopore peak is in $cm^3/g$.

The term "Large Mesopore Peak" for a material as used herein is defined as the maximum pore volume value calculated as dV/dlogD (y-axis) on a BJH $N_2$ Desorption Plot as described above (pore volume vs. pore diameter) between the 50 Å and 500 Å pore diameter range (x-axis). Unless otherwise noted, the unit of measurement for the large mesopore peak is in $cm^3/g$.

The term "BET Surface Area" for a material as used herein is defined as the surface area as determined by ASTM Specification D 3663. Unless otherwise noted, the unit of measurement for surface area is in $cm^2/g$.

The term "Unit Cell Size" for a material as used herein is defined as the unit cell size as determined by ASTM Specification D 3942. Unless otherwise noted, the unit of measurement used for unit cell size herein is in Angstroms (Å).

Although the pore diameters of the cells of the pure crystalline Y-type zeolite structure are approximately 7.4 Å in diameter as defined by the 12-membered zeolite ring structure, the zeolite crystals tend to contain defects in the overall structure which act as large pore structures or large pore (i.e., mesoporous) diameters. These larger pore structures possessed by the Y-type zeolites can be beneficial in providing size selective cracking sites in many industrial processes. Certain mesoporous pore structures (in particular those between 50 and 500 Å in diameter) can be beneficial to certain petroleum refining or petrochemical conversion processes such as, but not limited to, catalytic cracking, fluidized catalytic cracking, hydrocracking, hydrodesulfurization, reforming, alkylation, oligomerization, dewaxing, and isomerization.

One common use of Y-type zeolites is as a catalytic component in a type of fluid catalytic cracking process for conversion of hydrocarbon process feedstreams that contain a substantial amount of hydrocarbons in the gas oil and heavier boiling point range (boiling ranges of about 450 to about 1050° F.) into lighter fuel products, in particular gasolines, naphthas, and distillates. This petroleum refinery process is commonly termed as "Fluid Catalytic Cracking" or "FCC" and utilizes a zeolite-containing cracking catalyst that is fluidized prior to contacting the hydrocarbon process feedstream to the FCC unit. The Y-type zeolites, and in particular the Ultra Stable Y ("USY") zeolites, are particularly useful in these processes due to their high activity and selectivity to gasoline products as well as their strong surface area stability in the presence of high temperature steam.

As demand for crude supplies and feedstocks to petroleum refineries and petrochemical plants has increased, there has been a greater incentive to process heavier, higher molecular weight feedstreams in many of the associated separation and conversion units. In particular, as the overall feed compositions trend toward heavier molecular weight hydrocarbon feedstreams, it continues to become more desirable to catalytically crack these heavier feeds (also termed "bottoms cracking") to convert more of these components into high value liquid products.

As discussed, the Y-type zeolites, in particular the Ultrastable Y ("USY") zeolites, are a preferred zeolitic component in many catalysts due to their acidic cracking activity, their 3-dimensional structure, their high surface area hydrothermal stability, and their relatively low cost production. The ultrastable versions of the Y-zeolites are particularly preferred for fluid catalytic cracking applications due to their high resistance to degradation in the presence of high temperature steam (above about 1200° F.). Conventional USY zeolites are prepared by steam calcination of a partially ammonium-exchanged Na—Y zeolite at nominal temperatures of 1000-1200° F. The resulting USY zeolites typically exhibit a unit cell size in the range of about 24.50 to about 24.58 Å.

These conventional USY zeolites contain a significant volume associated with pores in the range of 30 to 50 Å diameter, which are easily observed by a standard nitrogen adsorption-desorption test as interpreted by the BJH method. FIG. 1 shows a typical the BJH $N_2$ Desorption Plot of a typical USY zeolite. As can be seen in FIG. 1, the USY exhibits a high volume of pores in the "small mesoporous" range (30 to 50 Å pore diameter) as well as a significant "small mesopore peak" in the BJH $N_2$ Desorption Plot of about 0.20 $cm^3/g$ or more in this small mesopore range. This high peak in the 30 to 50 Å pore diameter range of the BJH $N_2$ Desorption Plot is a common feature for Y-zeolite materials that possess a significant pore volume in the mesoporous range (30 to 500 Å pore diameters). This peak exhibited in the BJH $N_2$ Desorption Plot of the Y zeolites is termed herein as the "Small Mesopore Peak" of the zeolite and is defined above. Without wishing to be held to any theory, it is believed that this phenomenon occurs due to a "bottlenecking" of some of the mesoporous structures in the zeolite creating an ink-bottle effect wherein a significant amount of the nitrogen inside the internal pore cavities cannot be released during the desorption phase of the test until the partial pressure is reduced below the point associated with this small mesopore peak point. Typically in a standard nitrogen adsorption/desorption test this peak is associated at a point in the desorption branch at a relative nitrogen pressure ($P/P_o$) of about 0.4 to about 0.45. See "Characterization of Porous Solids and Powders: Surface Area, Pore Size and Density", by Lowell, S., Shields, J. E., Thomas, M. A., and Thommes, M., pp. 117-123, (Springer, Netherlands 2006), which is incorporated herein by reference.

As can further be seen in FIG. 1, there is no significant "large mesopore peak" associated with the large mesoporous structure (50 to 500 Å pore diameter range) of the USY zeolite. The USY sample of this example is further described in Example 1. While USY zeolites do not possess a significant volume of large mesopores (in the 50 and 500 Å diameter range) upon fabrication, they may develop these large mesopores upon steaming at high temperatures. A common test in the industry is to contact the zeolite with a high temperature steam (for example, 100% partial pressure steam at 1400° F. for 16 hours) to determine the hydrothermal stability of the zeolite. This test is designed to simulate the steaming conditions of a FCC unit wherein the catalysts are typically exposed to steam at elevated temperatures. The main reason for this test is to determine the ability of the zeolite to retain surface area when exposed to steam at high temperatures. However, upon severe steaming, Y-type zeolites also tend to increase the pore volume associated with the large mesopores, and the surface area of the zeolite tends to diminish as the steaming conditions become more severe.

Figure 2:
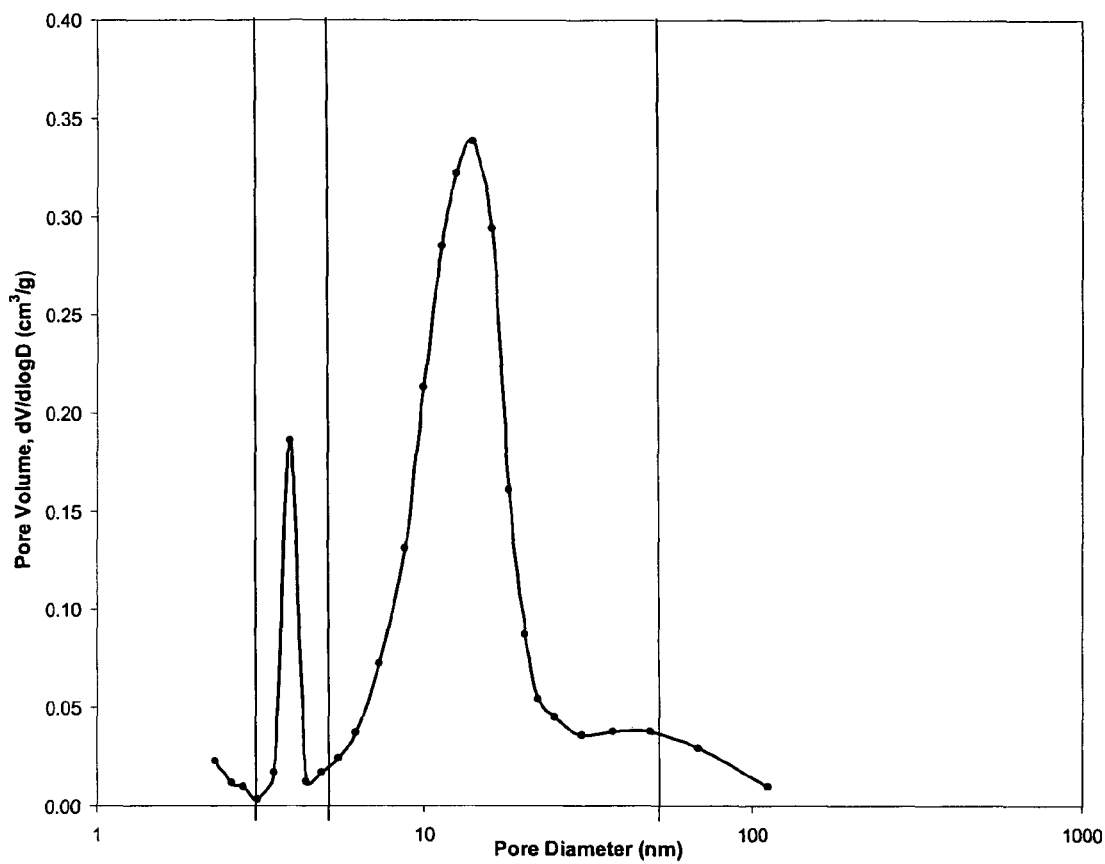
FIG. 2 is a BJH N₂ Desorption Plot of the USY zeolite of FIG. 1 after it has been subjected to ion exchange/calcination steps and long-term deactivation steaming at 1400° F. for 16 hours.

According to the details of Example 1, a conventional USY sample as described above and shown in FIG. 1 was further ammonium ion-exchanged three times and then steamed at 1400° F. for 16 hours to determine the resulting pore distribution and surface area stability of the USY zeolite under these hydrothermal conditions. FIG. 2 shows the BJH $N_2$ Desorption Plot of the ion-exchanged USY zeolite after long-term deactivation steaming. As can be seen from FIG. 2, the steamed USY develops a "large mesopore peak" in the large mesoporous structures (50 to 500 Å pore diameter range) of the zeolite. However, as also can be seen in FIG. 2, the "small mesopore peak", associated with pores in the 30 to 50 Å pore diameter range of the steamed USY, is not significantly decreased as compared to the small mesopore peak of the un-steamed USY sample as shown in FIG. 1. Here, the small mesopore peak of the steamed USY is about 0.19 $cm^3/g$.

While not wishing to be held to any theory, it is believed that the small and large mesoporous pore structures of the zeolite are created by defects and/or deterioration of the zeolite crystalline structure, thereby creating structural defect voids (or equivalent "pores") that are larger in size than those of the as-synthesized (pure crystal) structure of the zeolite.

What has been discovered in the present invention is a highly hydrothermally stable Y-zeolite that has a significantly suppressed small mesopore peak in both the as-fabricated and as-steamed conditions while maintaining a high volume of large mesopores (50 to 500 Å pore diameter range). In another embodiment of the present invention, is a highly hydrothermally stable Y-zeolite that has a significantly suppressed small mesopore peak in both the as-fabricated and as-steamed conditions while maintaining a high ratio of large-to-small mesoporous volume. The zeolite of this invention is termed herein as an "Extra Mesoporous Y" (or "EMY") zeolite.

In an embodiment of the EMY zeolite of the current invention, the starting material is a conventional Na—Y type zeolite with a sodium oxide ($Na_2O$) content of about 10 to 15 wt %. In an embodiment of the present invention, the EMY zeolite precursor is ammonium-exchanged to lower the $Na_2O$ content to a desired level for the production of an EMY zeolite. Generally, about one to about three ammonium-exchanges are required to reduce the $Na_2O$ content of a typical Na—Y precursor to a desired level for the production of an EMY zeolite. Based on fabrication testing, it is believed by the inventor at this time that the sodium level of the EMY precursor must be maintained in certain ranges in order to obtain an EMY zeolite. In a preferred embodiment of the present invention, the $Na_2O$ content of the ammonium-exchanged Na—Y zeolite precursor is brought to about 2.0 to about 5.0 wt % $Na_2O$. More preferably, the $Na_2O$ content of the ammonium-exchanged Na—Y zeolite precursor is brought to about 2.3 to about 4.0 wt % $Na_2O$. In this preferred embodiment, it is believed that the number of ion-exchange steps performed is not essential to the formation of EMY as long as the $Na_2O$ content of the EMY precursor is within a desired range. Unless otherwise noted, the $Na_2O$ content is as measured on the zeolite precursor prior to high temperature steam calcination and reported on a dry basis.

The EMY precursors or the final EMY zeolite may also be rare earth exchanged to obtain a rare earth exchanged EMY or "RE-EMY" zeolite. The zeolites may be rare earth exchanged in accordance with any ion-exchange procedure known in the art. It should also be noted that the weight percentages used herein are based on the dry weight of the zeolite materials.

The ammonium-exchanged Na—Y precursor thus obtained is subjected to a very rapid high temperature steam calcination. In this high temperature steam calcination process, the temperature of the steam is from about 1200 to about 1500° F. More preferably the temperature of the steam is from about 1200 to about 1450° F., more preferably from about 1250 to about 1450° F., and even more preferably from about 1300 to about 1450° F. These high temperature steam calcination temperatures for the production of an EMY zeolite are generally higher than those used in the production of conventional USY zeolites which are high temperature steam calcined at temperatures from about 1000 to about 1200° F. and do not undergo the rapid heating in the high temperature calcination step as the EMY zeolites of the present invention.

It has been discovered that it is important in achieving the EMY zeolite structure that the zeolite precursor be brought up close to the desired steaming temperature in a very rapid manner. The temperature of the zeolite during the steaming process may be measured by a thermocouple implanted into the bed of the EMY zeolite precursor.

In a preferred embodiment of making the EMY zeolite of the present invention, the temperature of the zeolite is raised from a standard pre-calcination temperature to within 50° F. (27.8° C.) of the steam temperature during the high temperature steam calcination step in less than about 5 minutes. In a more preferred embodiment of making the EMY zeolite of the present invention, the temperature of the zeolite is raised from a standard pre-calcination temperature to within 50° F. (27.8° C.) of the steam temperature during the high temperature steam calcination step in less than about 2 minutes.

Although not critical to the fabrication process and not so limited as to the claimed invention herein, typically the pre-calcination temperature in a Y-type zeolite manufacturing process is from about 50° F. to about 300° F. Although not wishing to be held to any theory, it is believed that if the EMY precursor is held at temperatures above about 300° F. prior to rapid high temperature steam calcination, that formation of a final EMY material may be hindered.

Figure 3:
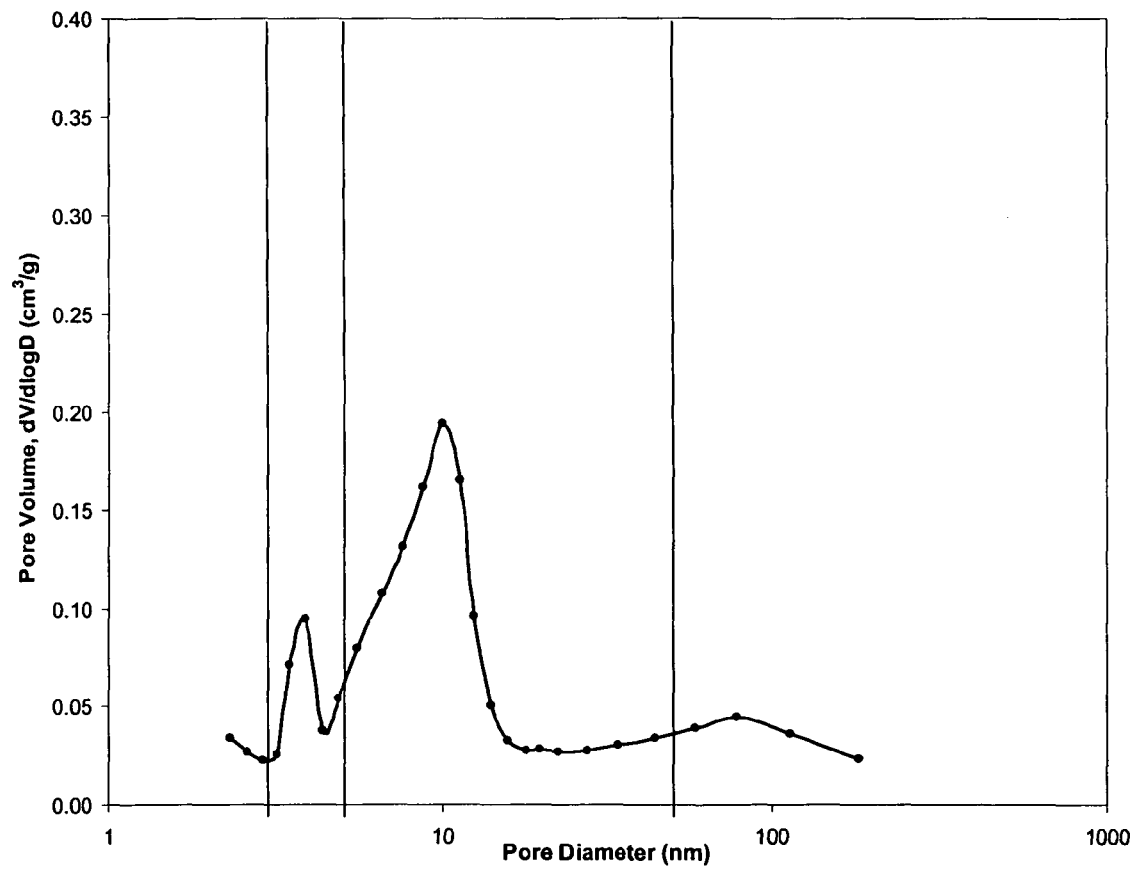
FIG. 3 is a BJH N₂ Desorption Plot of an embodiment of an Extra Mesoporous Y ("EMY") zeolite of the present invention.

Example 2 herein describes the synthesis of one embodiment of an Extra Mesoporous Y ("EMY") zeolite. FIG. 3 shows the BJH $N_2$ Desorption Plot of the EMY zeolite sample from Example 2 prior to additional ammonium exchange and long-term deactivation steaming. As can be seen in FIG. 3, the EMY zeolite exhibits a very low volume of pores in the "small mesoporous" range (30 to 50 Å pore diameter) as well as a very low "small mesopore peak" of about 0.09 cm$^3$/g in this small mesopore range. In comparing FIG. 1 (USY zeolite) and FIG. 3 (EMY zeolite) it should be noted that this "small mesopore peak" has been substantially depressed in the EMY zeolite. It can be seen in FIG. 1 that this small mesopore peak is about 0.20 cm$^3$/g for the USY as compared to the small mesopore peak of about 0.09 cm$^3$/g for the EMY as shown in FIG. 3.

As can further be seen in FIG. 3, there is beneficially a significant "large mesopore peak" associated mainly with the large mesoporous structures (50 to 500 Å pore diameter range) of the EMY zeolite. Comparing this to the BJH $N_2$ Desorption Plot of the USY zeolite in FIG. 1, it can be seen that the EMY zeolite in FIG. 3 exhibits a significant large mesopore peak of about 0.19 cm$^3$/g whereas the USY zeolite in FIG. 1 shows no significantly comparable large mesopore peak in this range.

The pore volumes in each of the ranges, 30 to 50 Angstroms as well as 50 to 500 Angstroms were determined by utilizing the pore volume data from the BJH $N_2$ Desorption tests and interpolating the data to the necessary endpoints. This method for calculating the pore volumes is explained in detail in Example 1 and the same method for calculating the pore volumes was utilized throughout all examples herein. The method as described therein defines how to interpret and calculate the pore volume values of the zeolites within each of the defined pore diameter ranges.

The "small mesopore" and "large mesopore" pore volumes and the BET surface areas for the USY and EMY zeolites of FIGS. 1 and 3, respectively, were measured and are shown in Table 1 as follows:

TABLE 1

| | Zeolite Properties prior to Long-Term Steaming | | | | | |
|---|---|---|---|---|---|---|
| Zeolite | Small (30-50 Å) Mesopore Volume (cm$^3$/g) | Large (50-500 Å) Mesopore Volume (cm$^3$/g) | Large-to-Small Pore Volume Ratio | Small Mesopore Peak, dV/dlogD (cm$^3$/g) | BET Surface Area (m$^2$/g) | Unit Cell Size (Å) |
| USY (FIG. 1) | 0.0193 | 0.0195 | 1.01 | 0.20 | 811 | 24.55 |
| EMY (FIG. 3) | 0.0109 | 0.0740 | 6.79 | 0.09 | 619 | 24.42 |

It should be noted that FIGS. 1 and 3, as well as the data in Table 1, reflect the USY and EMY zeolite samples after the high temperature steam calcination step and prior to any subsequent treating. As can be seen in Table 1, the volume of small mesopores is larger in the USY zeolite than in the EMY zeolite. However, it can also be seen that the volume of large mesopores in the EMY zeolite is significantly larger than the volume of large mesopores in the USY zeolite. As discussed, it is desired to lower the amount of pore volume in the small mesopore range and increase the amount of pore volume in the large mesopore range of the zeolite. Therefore, an important characteristic of the zeolite is the ratio of the large mesopore volume ("LMV") to the small mesopore volume ("SMV") of the subject zeolite. We term this ratio of the LMV:SMV as the "Large-to-Small Pore Volume Ratio" or "LSPVR" of the zeolite.

As can be seen from Table 1, the Large-to-Small Pore Volume Ratio or "LSPVR" of the sample USY zeolite is about 1.01 wherein the LSPVR of the sample EMY zeolite is about 6.79. This is a significant shift in the Large-to-Small Pore Volume Ratio obtained by the present invention. In a preferred embodiment, the LSPVR of the EMY is at least about 4.0, more preferably at least about 5.0, and even more preferably, the LSPVR of the EMY is at least about 6.0 immediately after the first high temperature steam calcination step as described herein.

Additionally, the EMY zeolites of the present invention may be used in processes that are not subject to exposure to high temperature hydrothermal conditions. It can be seen from Table 1, that one of the remarkable aspects of the EMY zeolites of the present invention is that they exhibit very high Large Mesopore Volumes as compared to the comparable USY of the prior art. This characteristic of the EMY zeolites of the present invention can be valuable to many commercial processes. In preferred embodiments, the as-fabricated EMY zeolites of the present invention have a Large Mesopore Volume of at least 0.03 cm³/g, more preferably at least 0.05 cm³/g, and even more preferably at least 0.07 cm³/g.

As utilized herein, the term "as-fabricated" is defined as the zeolite obtained after the high temperature steam calcination step. As is known to one of skill in the art, the "long-term deactivation steaming" referred to herein is generally utilized as a tool to test the ability of the as-fabricated zeolite to withstand hydrothermal conditions and is not considered as a part of the fabrication of the zeolite.

It should also be noted that it is obvious to those of skill in the art that long-term deactivation steaming will tend to increase the Large Mesopore Volume of typical Y zeolites. However, this unusual aspect of the EMY zeolites of the present invention of possessing such a significantly increased Large Mesopore Volume prior to long-term deactivation steaming can be useful in processes wherein high temperature hydrothermal conditions are not present or even more importantly in processes wherein it is undesired for the fabricated zeolite to be long-term steam deactivated. The as-fabricated EMY zeolite possesses higher BET surface areas as compared to the BET surface areas after the log-term steam deactivation and the as-fabricated EMY zeolite may be more stable in some applications than that the EMY zeolite obtained after long-term steam deactivation.

It can also be seen from comparing FIG. 1 (USY zeolite sample) and FIG. 3 (EMY zeolite sample) that the small mesopore peak in the 30 to 50 Å pore diameter range is significantly lower for the EMY zeolite than the USY zeolite. In a preferred embodiment, the as-fabricated EMY zeolite obtained following the high temperature steam calcination exhibits a Small Mesopore Peak of less than about 0.15 cm³/g. In a more preferred embodiment, the EMY zeolite has a Small Mesopore Peak of less about 0.13 cm³/g, and in an even more preferred embodiment, the Small Mesopore Peak of the EMY is less than about 0.11 cm³/g. The Small Mesopore Volume Peak as defined prior is the maximum value (or peak) of the pore volume value (dV/dlogD, y-axis) exhibited on the BJH $N_2$ Desorption Plot in the 30 to 50 Angstroms (Å) pore diameter range.

described herein. This smaller unit cell size generally results in a more stable zeolite configuration due to the higher framework silica/alumina ratios reflected by the lower unit cell sizes of EMY zeolite.

Figure 4:
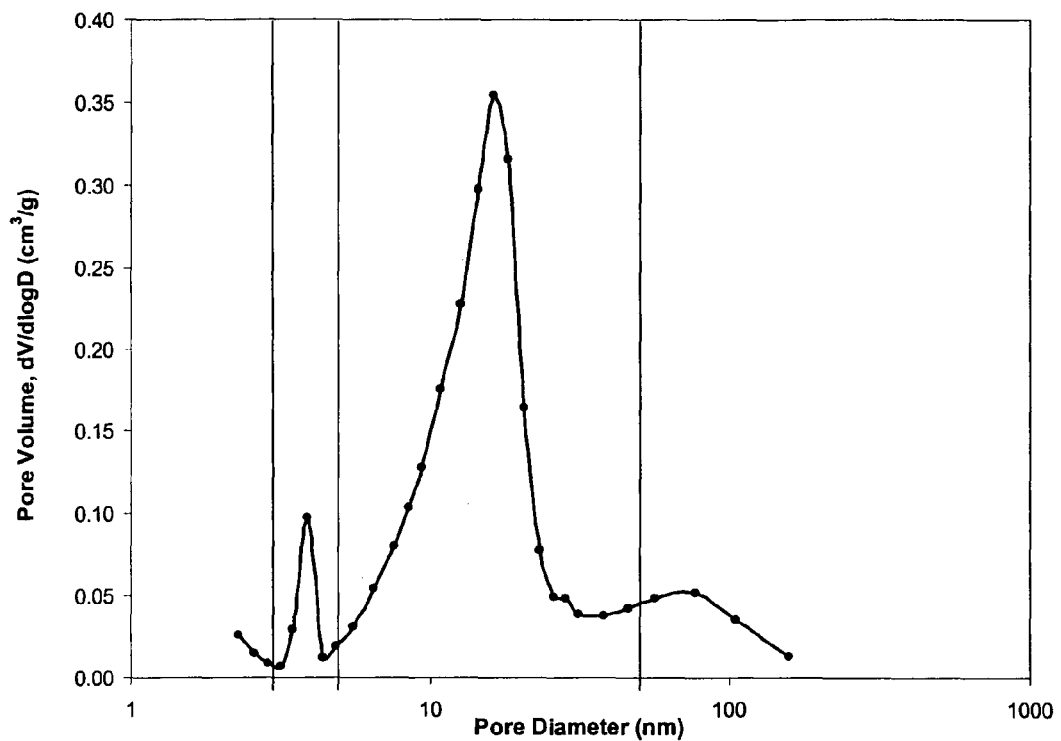
FIG. 4 is a BJH N₂ Desorption Plot of an embodiment of an Extra Mesoporous Y ("EMY") zeolite of the present invention after it has been subjected to ion-exchange/calcination steps and long-term deactivation steaming at 1400° F. for 16 hours.

The USY zeolite sample as described in Example 1 and shown in the BJH $N_2$ Desorption Plot of FIG. 1 as well as the EMY zeolite sample as described in Example 2 and shown in the BJH $N_2$ Desorption Plot of FIG. 3 were further ammonium ion-exchanged and then long-term deactivation steamed at 1400° F. for 16 hours to determine the long-term hydrothermal stability of the USY and EMY zeolites. FIG. 2 shows the BJH $N_2$ Desorption Plot of the ion-exchanged USY zeolite of the prior art after long-term deactivation steaming. FIG. 4 shows the BJH $N_2$ Desorption Plot of the ion-exchanged EMY zeolite of an embodiment of the present invention after long-term deactivation steaming. As can be seen from FIG. 4, the Large Mesopore Peak of the EMY zeolite increased desirably from about 0.19 cm³/g (as shown in FIG. 3) to about 0.36 cm³/g (as shown in FIG. 4) after long-term deactivation steaming. Just as desirable, following long-term deactivation steaming of the EMY zeolite, the Small Mesopore Peak of the EMY zeolite was not significantly increased. The Small Mesopore Peak of the EMY zeolite remained essentially constant at about 0.10 cm³/g (as shown in FIGS. 3 and 4).

In contrast, in the comparative USY zeolite of the prior art, the Small Mesopore Peak remained undesirably high at about 0.19 cm³/g after long-term deactivation steaming (see FIG. 2).

The physical properties of the zeolites obtained after long-term deactivation steaming in Examples 1 and 2 are tabulated in Table 2 below. In Table 2 below, are shown the "Small Mesopore Volumes", the "Large Mesopore Volumes, the "Large-to-Small Pore Volume Ratios", and the Small Mesopore Peaks" for the USY and EMY zeolites illustrated in FIGS. 2 and 4, respectively, as well as the associated BET surface areas and the unit cell sizes as measured following three ammonium ion-exchanges and long-term deactivation steaming at 1400° F. for 16 hours.

TABLE 2

| | Zeolite Properties after Long-Term Deactivation Steaming | | | | | |
|---|---|---|---|---|---|---|
| Zeolite | Small (30-50 Å) Mesopore Volume (cm³/g) | Large (50-500 Å) Mesopore Volume (cm³/g) | Large-to-Small Pore Volume Ratio | Small Mesopore Peak, dV/dlogD (cm³/g) | BET Surface Area (m²/g) | Unit Cell Size (Å) |
| USY (FIG. 2) | 0.0112 | 0.1211 | 10.85 | 0.19 | 565 | 24.27 |
| EMY (FIG. 4) | 0.0077 | 0.1224 | 15.97 | 0.10 | 587 | 24.27 |

In addition, the EMY materials of the present invention exhibit smaller unit cell sizes as compared to similar USY materials that have undergone a single high temperature steam calcination step. As can be seen in Table 1, the USY zeolite of Example 1 has a unit cell size of about 24.55 Å, while the EMY zeolite prepared from similar starting materials has a significantly lower unit cell size of about 24.42 Å.

It has been discovered that in preferred embodiments, these as-fabricated EMY zeolites exhibit unit cell size ranging from about 24.37 to about 24.47 Å after the first high temperature steam calcination step as described herein. In even more preferred embodiments, the as-fabricated EMY zeolites will have a unit cell size ranging from about 24.40 to about 24.45 Å after the first high temperature steam calcination step as Another benefit of the EMY zeolites of the present invention is surface area stability. As can be seen in Table 2, the BET surface area for the long-term deactivation steamed EMY zeolite sample was greater than the BET surface area for the USY sample. Additionally, the EMY retained a higher percentage of the surface area after the three ammonium ion exchanges and long-term deactivation steaming at 1400° F. for 16 hours. Comparing Table 1 and Table 2, the USY retained about 70% of its original surface area wherein the EMY retained about 95% of its original surface area, indicating the superior hydrostability of the EMY zeolites of the present invention. In preferred embodiments of the present invention, the EMY zeolite has BET Surface Area of at least 500 m²/g as measured either before long-term deactivation steaming at 1400° F. for 16 hours or after long-term deactivation steaming at 1400° F. for 16 hours.

In a preferred embodiment, the "Large-to-Small Pore Volume Ratio" (or "LSPVR") of the EMY is at least about 10.0, more preferably at least about 12.0, and even more preferably, the LSPVR of the EMY is at least about 15.0 after long-term deactivation steaming at 1400° F. for 16 hours.

Example 3 shows the differing effects of varying the high temperature steam calcination temperature in attempting to fabricate an EMY zeolite. The details of the precursor and the high temperature steam calcination steps are explained further in Example 3. The BJH $N_2$ Desorption Plots for the six zeolite samples (labeled samples 3A through 3F) in Example 3 are shown respectively in FIGS. 5 through 10. Table 3 below also tabulates some of the important characteristics of the zeolite products obtained from the testing in this Example.

TABLE 3

Zeolite Properties from Samples 3A through 3F of Example 3

| Zeolite Sample | Small (30-50 Å) Mesopore Volume (cm³/g) | Large (50-500 Å) Mesopore Volume (cm³/g) | Large-to-Small Pore Volume Ratio | Small Mesopore Peak, dV/dlogD (cm³/g) | BET Surface Area (m²/g) | Unit Cell Size (Å) |
|---|---|---|---|---|---|---|
| Sample 3A (FIG. 5) | 0.0088 | 0.0200 | 2.27 | 0.09 | 934 | N/A |
| Sample 3B (FIG. 6) | 0.0207 | 0.0327 | 1.58 | 0.16 | 865 | 24.54 |
| Sample 3C (FIG. 7) | 0.0157 | 0.0510 | 3.25 | 0.11 | 786 | 24.49 |
| Sample 3D (FIG. 8) | 0.0119 | 0.0542 | 4.55 | 0.11 | 774 | 24.47 |
| Sample 3E (FIG. 9) | 0.0095 | 0.0722 | 7.58 | 0.09 | 745 | 24.45 |
| Sample 3F (FIG. 10) | 0.0147 | 0.0899 | 6.12 | 0.21 | 518 | 24.42 |

As can be seen in Table 3, the precursor (Sample 3A) has no severe Small Mesopore Peak in the 30 to 50 Å pore diameter range, and no significant Large Mesopore Peak (see FIG. 5) in the 50 to 500 Å pore diameter range. This precursor (unsteamed) Sample 3A is used as a basis for comparison of the other Samples 3B through 3F. When the precursor was high temperature steam calcined in Sample 3B with a 100% partial pressure steam at 1000° F. for one hour, the zeolite experienced an increase in the Small Mesopore Peak in the 30 to 50 Å range (from 0.09 cm³/g to 0.16 cm³/g), and there was not a significant Large Pore Volume increase (see FIG. 6). This sample did not meet the characteristics necessary for the EMY zeolite of the present invention.

The precursor of Sample 3C was high temperature steam calcined with a 100% partial pressure steam at 1200° F. for one hour. The zeolite obtained under the conditions of Sample 3C experienced a significant decrease in the Small Mesopore Peak in the 30 to 50 Å pore diameter range as compared to Sample 3B (from 0.16 cm³/g to 0.11 cm³/g) as well as a simultaneous significant increase in the Large Mesopore Volume (see FIG. 7, as well as Table 3). This sample was within the desired characteristics of the preferred embodiments of the EMY zeolites of the present invention.

The precursor of Sample 3D was high temperature steam calcined with a 100% partial pressure steam at 1300° F. for one hour. Here it can be seen in Table 3 as well as FIG. 8, that the zeolite obtained experienced a similar decrease in the Small Mesopore Peak in the 30 to 50 Å pore diameter range as compared to Sample 3B. However, more importantly, the Large Mesopore Volume of Sample 3D increased significantly as compared to Samples 3B and 3C (see FIG. 8, as well as Table 3). As can be seen in Table 3, the Large-to-Small Pore Volume Ratio ("LSPVR") increased to approximately 4.55 as is desired in the EMY zeolites of the present invention.

The desired characteristics of the EMY zeolite were even more pronounced in Sample 3E. In Sample 3E, precursor was high temperature steam calcined with a 100% partial pressure steam at 1400° F. for one hour. In reviewing Table 3 and FIG. 9, it can be seen that the Large Mesopore Volume was further increased as compared to the prior samples and also importantly, the Large-to-Small Pore Volume Ratio ("LSPVR") increased to 7.58 in the final zeolite as is desirable. In addition, it can be seen that the Small Mesopore Peak for Sample 3E (FIG. 9) was further reduced to 0.09 cm³/g, within the limitations of the more preferred embodiments of the EMY zeolites of the present invention.

Figure 10:
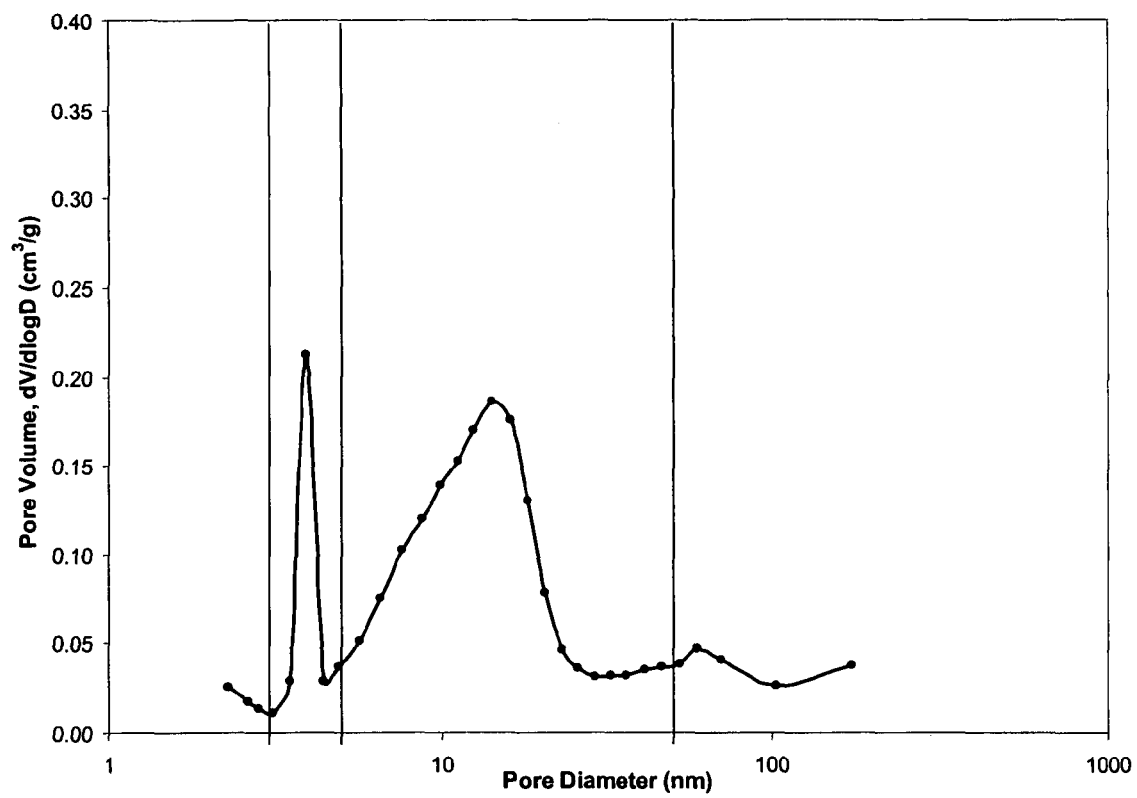
FIG. 10 is a BJH N₂ Desorption Plot of an EMY zeolite precursor that has been high temperature steam calcined at 1500° F. for 1 hour in 100% steam wherein the EMY zeolite precursor temperature during the high temperature steam calcination was raised to within 50° F. of the high temperature steam calcination temperature within 2 minutes.

Lastly from the samples of Example 3, FIG. 10 shows the BJH $N_2$ Desorption Plot for the zeolite obtained from the precursor in Sample 3F which was high temperature steam calcined with a 100% partial pressure steam at 1500° F. for 1 hour. Here it can be seen that the product zeolite appears to have more degradations at the high temperature steam calcination temperature. Although the Large Mesopore Volume was further increased in the zeolite, the Small Mesopore Peak was also increased for the Sample 3F (FIG. 10). The value of this Small Mesopore Peak for Sample 3F (0.21 cm³/g) exceeds the limitations of the embodiments of the EMY zeolites.

In a preferred embodiment of the present invention, the Y zeolite of the present invention (i.e., "EMY") is utilized in a process for converting a hydrocarbon-containing feedstream, comprising:

a) contacting the hydrocarbon-containing feedstream with the Y zeolite in a petroleum refining process; and b) producing at least one product stream which has a lower average molecular weight than the hydrocarbon-containing feedstream;

wherein the zeolite has a Large Mesopore Volume of at least about 0.03 cm³/g, and a Small Mesopore Peak of less than about 0.15 cm³/g.

In a preferred embodiment, the EMY zeolite of the present invention is utilized in a petroleum refining or petrochemical conversion processes selected from catalytic cracking, fluidized catalytic cracking, hydrocracking, hydrodesulfurization, reforming, alkylation, oligomerization, dewaxing, and isomerization. In a preferred embodiment, the EMY zeolite of the present invention is utilized in a catalytic cracking process. In a more preferred embodiment, the EMY zeolite of the present invention is utilized in a fluidized catalytic cracking process.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

The Examples below are provided to illustrate the manner in which the EMY zeolites of the current invention were synthesized and illustrate the improved product qualities and the benefits from specific embodiments of the current invention thus obtained. These Examples only illustrate specific embodiments of the present invention and are not meant to limit the scope of the current invention.

EXAMPLES

Example 1

A commercial ammonium-exchanged Y zeolite with a low sodium content (CBV-300® from Zeolyst™, $SiO_2/Al_2O_3$ molar ratio=5.3, $Na_2O$ 3.15 wt % on dry basis) was steamed in a horizontal calcination oven which was at a temperature of 1000° F. and in a flow of 50% steam+50% $N_2$ for 1 hour. The resulting product was an ultra-stable Y (USY) zeolite, and was analyzed with a Micromeritics® Tristar 3000® analyzer to determine the pore size distribution characteristics by nitrogen adsorption/desorption at 77.35° K. The BJH method as described in the specification was applied to the $N_2$ adsorption/desorption isotherms to obtain the pore size distribution of the zeolite, and a plot of dV/dlogD vs. Average Pore Diameter is shown in FIG. 1.

A copy of the pertinent data generated by the BJH method generated from the $N_2$ adsorption/desorption isotherms for this zeolite sample is reproduced in Table 4 below. This test method and the associated format of data generated as presented are familiar to one of skill in the art.

TABLE 4

BJH Pore Volume Distribution of USY Sample

| Pore Diameter Range (nm) | Average Diameter (nm) | dV/dlogD Pore Volume (nm) | Cumulative Pore Volume (cm³/g) | Incremental Pore Volume (cm³/g) |
|---|---|---|---|---|
| 312.8-104.1 | 124.1 | 0.010 | 0.0048 | 0.0048 |
| 104.1-62.8 | 73.6 | 0.017 | 0.0085 | 0.0037 |
| 62.8-41.5 | 47.8 | 0.018 | 0.0117 | 0.0032 |
| 41.5-30.4 | 34.1 | 0.018 | 0.0142 | 0.0024 |
| 30.4-22.9 | 25.5 | 0.017 | 0.0162 | 0.0020 |
| 22.9-18.6 | 20.3 | 0.015 | 0.0175 | 0.0014 |
| 18.6-16.8 | 17.6 | 0.016 | 0.0182 | 0.0007 |
| 16.8-15.0 | 15.8 | 0.014 | 0.0189 | 0.0007 |
| 15.0-13.2 | 14 | 0.0152 | 0.0198 | 0.0008 |
| 13.2-11.7 | 12.4 | 0.0151 | 0.0206 | 0.0008 |
| 11.7-10.6 | 11.1 | 0.014 | 0.0212 | 0.0006 |

TABLE 4-continued

BJH Pore Volume Distribution of USY Sample

| | | | | |
|---|---|---|---|---|
| 10.6-9.3 | 9.8 | 0.014 | 0.0220 | 0.0008 |
| 9.3-8.2 | 8.6 | 0.016 | 0.0229 | 0.0009 |
| 8.2-7.1 | 7.5 | 0.019 | 0.0241 | 0.0012 |
| 7.1-6.1 | 6.5 | 0.027 | 0.0259 | 0.0019 |
| 6.1-5.3 | 5.6 | 0.044 | 0.0286 | 0.0027 |
| 5.3-4.6 | 4.9 | 0.055 | 0.0317 | 0.0031 |
| 4.6-4.1 | 4.4 | 0.054 | 0.0344 | 0.0027 |
| 4.1-3.7 | 3.9 | 0.203 | 0.0443 | 0.0099 |
| 3.7-3.3 | 3.5 | 0.075 | 0.0476 | 0.0033 |
| 3.3-2.9 | 3.1 | 0.036 | 0.0497 | 0.0022 |
| 2.9-2.6 | 2.8 | 0.044 | 0.0517 | 0.0019 |
| 2.6-2.5 | 2.5 | 0.049 | 0.0531 | 0.0014 |
| 2.5-2.2 | 2.3 | 0.062 | 0.0558 | 0.0028 |

As can be seen in Table 4, a calculated Cumulative Pore Volume (cm³/g) is associated with a range of Pore Diameter (nm) as the test incrementally desorbs the nitrogen from the test sample. An Incremental Pore Volume is then calculated for each of these ranges. A pore volume within a certain range (for example a range from 50 to 500 Å, which is equivalent to 5 to 50 nm as presented in Table 4) can be calculated by subtracting the Cumulative Pore Volume at 50 nm from the Cumulative Pore Volume at 5 nm. Where necessary, the Cumulative Pore Volume at a specific pore size can be calculated by interpolating the data within the range. This method was utilized for all of the Examples herein.

For example, to determine the total pore volume associated with pore diameters between 5 nm and 50 nm, first the Cumulative Pore Volume associated with 50 nm was calculated by interpolating the amount of the Incremental Pore Volume (highlighted) associated with the difference between 62.8 nm and 50.0 nm in the 62.8 to 41.5 nm pore diameter range as shown in the table (highlighted) and adding this amount to the Cumulative Pore Volume (highlighted) from the prior range. The calculation for the Cumulative Pore Volume associated with 50 nm pore diameter was calculated from the data in Table 4 above as follows:

$$((62.8-50.0)/(62.8-41.5)*0.0032)+0.0085=0.0104 \text{ cm}^3/\text{g}$$

The calculation is then performed similarly for the Cumulative Pore Volume associated with 5 nm pore diameter. The calculation was as follows:

$$((5.3-5.0)/(5.3-4.6)*0.0031)+0.0286=0.0299 \text{ cm}^3/\text{g}$$

The total Pore Volume associated with the pore diameter ranges of 5 nm to 50 nm (50 Å to 500 Å) of the USY of this example is thus equal to the difference in the Cumulative Pore Volumes associated with 5 nm and 50 nm respectfully as follows:

$$0.0299 \text{ cm}^3/\text{g} - 0.0104 \text{ cm}^3/\text{g} = 0.0195 \text{ cm}^3/\text{g}$$

This value is the Large Mesopore Volume for this USY sample as shown in Table 1. All other pore volumes associated with specific pore diameter ranges can be and were calculated herein by the same basic method.

As such, the following properties of this USY zeolite were obtained from the data:

Small Mesoporous Volume (Range: 3.0 nm to 5.0 nm): 0.0193 cm³/g

Large Mesoporous Volume (Range: 5.0 nm to 50.0 nm,): 0.0195 cm³/g

Ratio of (Large Mesopore Volume)/(Small Mesopore Volume): 1.01

Small Mesopore Peak (dV/dlogD@3.9 nm): 0.20 cm$^3$/g

Additionally, the USY zeolite sample exhibited a BET surface area of 811 m$^2$/g, and a unit cell size of 24.55 angstroms.

A sample of the prepared USY zeolite above was further subjected to an ammonium ion-exchange consisting of adding 80 grams of the zeolite into 800 ml of NH$_4$NO$_3$ (1M) solution at 70° C. and agitating for 1 hour, followed by filtration on a funnel and washing the filter cake with 1000 ml of de-ionized water. The water rinsed zeolite cake was dried on the funnel by pulling air through, then in an oven at 120° C. in air for over 2 hours, Chemical analysis of the dried zeolite by ICP showed 0.48 wt % Na$_2$O (dry basis). A Na$_2$O content of about 0.50 wt % was targeted. The dried zeolite was subjected to long-term deactivation steaming at 1400° F. for 16 hours, 100% steam, to determine its hydrothermal stability.

The zeolite obtained after long-term deactivation steaming was similarly analyzed in a Micromeritics® Tristar 3000® analyzer. The BJH method was applied to the N$_2$ adsorption/desorption isotherms to obtain the pore size distribution of the zeolite, and a plot of dV/dlogD vs. Average Pore Diameter is shown in FIG. 2. The following properties of this long-term deactivation steamed USY zeolite were obtained from the data:

Small Mesoporous Volume (Range: 3.0 nm to 5.0 nm): 0.0112 cm$^3$/g

Large Mesoporous Volume (Range: 5.0 nm to 50.0 nm,): 0.1211 cm$^3$/g

Ratio of (Large Mesopore Volume)/(Small Mesopore Volume): 10.85

Small Mesopore Peak (dV/dlogD@3.9 nm): 0.19 cm$^3$/g

Additionally, the USY zeolite after long-term deactivation steaming exhibited a BET surface area of 565 m$^2$/g, and a unit cell size of 24.27 angstroms.

Example 2

In this example, an embodiment of the Extra Mesoporous Y ("EMY") zeolite was prepared as follows:

The same commercial ammonium-exchanged Y zeolite (CBV-300®) with a low sodium content (SiO$_2$/Al$_2$O$_3$ molar ratio=5.3, Na$_2$O 3.15 wt % on dry basis) as in Example 1 was placed in a horizontal quartz tube, which was inserted into a horizontal oven pre-equilibrated at 1400° F. in 100% steam at atmospheric pressure. Utilizing this procedure, the temperature of the zeolite precursor was raised to within 50° F. of the high temperature steam calcination temperature (i.e., to 1350° F.) within 5 minutes. The steam was let to pass through the zeolite powders. After 1 hour, the tube was removed from the horizontal oven and resulting EMY zeolite powders were collected. It should be noted that the starting material (i.e., the EMY precursor zeolite) selected was a low sodium content Y zeolite. As described in the specification above, it is believed that production of the EMY zeolite is dependent upon the proper zeolite sodium content prior to high temperature steam calcination. If the sodium content is not within the specifications as described herein, the starting Y zeolite may first require ammonium-exchange or methods as known in the art to reduce the sodium content of the EMY zeolite precursor to acceptable levels prior to high temperature steam calcination to produce the EMY zeolite.

The resulting EMY zeolite was analyzed by a Micromeritics® Tristar 3000® analyzer as used in Example 1. The BJH method as described in the specification was applied to the N$_2$ adsorption/desorption isotherms to obtain the pore size distribution of the zeolite, and a plot of dV/dlogD vs. Average Pore Diameter is shown in FIG. 3. The following properties of this EMY zeolite were obtained:

Small Mesoporous Volume (Range: 3.0 nm to 5.0 nm): 0.0109 cm$^3$/g

Large Mesoporous Volume (Range: 5.0 nm to 50.0 nm,): 0.0740 cm$^3$/g

Ratio of (Large Mesopore Volume)/(Small Mesopore Volume): 6.79

Small Mesopore Peak (dV/dlogD@3.9 nm): 0.09 cm$^3$/g

Additionally, the EMY zeolite sample exhibited a BET surface area of 619 m$^2$/g, and a unit cell size of 24.42 angstroms.

A sample of the EMY zeolite above was further subjected to an ammonium ion exchange consisting of adding 100 grams of the EMY zeolite into 1000 ml of NH$_4$NO$_3$ (1M) solution at 70° C. and agitating for 1 hour, followed by filtration on a funnel and washing the filter cake with 1000 ml of de-ionized water. The water rinsed zeolite cake was dried on the funnel by pulling air through, then in an oven at 120° C. in air for over 2 hours. The ammonium ion exchange was repeated using 60 g of the washed EMY zeolite in 600 ml of NR$_4$NO$_3$ (1M) solution at 70° C. and agitating for 1 hour, followed by filtration on a funnel and washing the filter cake with 1000 ml of de-ionized water. The water rinsed zeolite cake was dried on the funnel by pulling air through, then in an oven at 120° C. in air for over 2 hours. Chemical analysis of the dried zeolite by ICP showed 0.64 wt % Na$_2$O (dry basis). A Na$_2$O content of about 0.50 wt % was targeted. This zeolite was then subjected to long-term deactivation steaming at 1400° F. for 16 hours, 100% steam, to determine its hydrothermal stability.

The EMY zeolite obtained after long-term deactivation steaming was also analyzed by a Micromeritics® Tristar 3000® analyzer. The BJH method was applied to the N$_2$ adsorption/desorption isotherms to obtain the pore size distribution of the zeolite, and a plot of dV/dlogD vs. Average Pore Diameter is shown in FIG. 4. The following properties of the EMY zeolite after long-term deactivation steaming were thus obtained from the data:

Small Mesoporous Volume (Range: 3.0 nm to 5.0 nm): 0.0077 cm$^3$/g

Large Mesoporous Volume (Range: 5.0 nm to 50.0 nm,): 0.1224 cm$^3$/g

Ratio of (Large Mesopore Volume)/(Small Mesopore Volume): 15.97

Small Mesopore Peak (dV/dlogD@3.9 nm): 0.10 cm$^3$/g

Additionally, the surface area of the EMY zeolite after long-term deactivation steaming was analyzed by a BET Test. The zeolite exhibited a BET surface area of 587 m$^2$/g, and a unit cell size of 24.27 angstroms.

Example 3

In this example, the same ammonium-exchanged commercial Y zeolite CBV-300® as in Example 1 and 2 was subjected to differing high temperature steam calcining steps as follows and each of the resulting Samples 3A through 3F were analyzed using a Micromeritics® Tristar 3000® analyzer similar to Examples 1 and 2.

Figure 5:
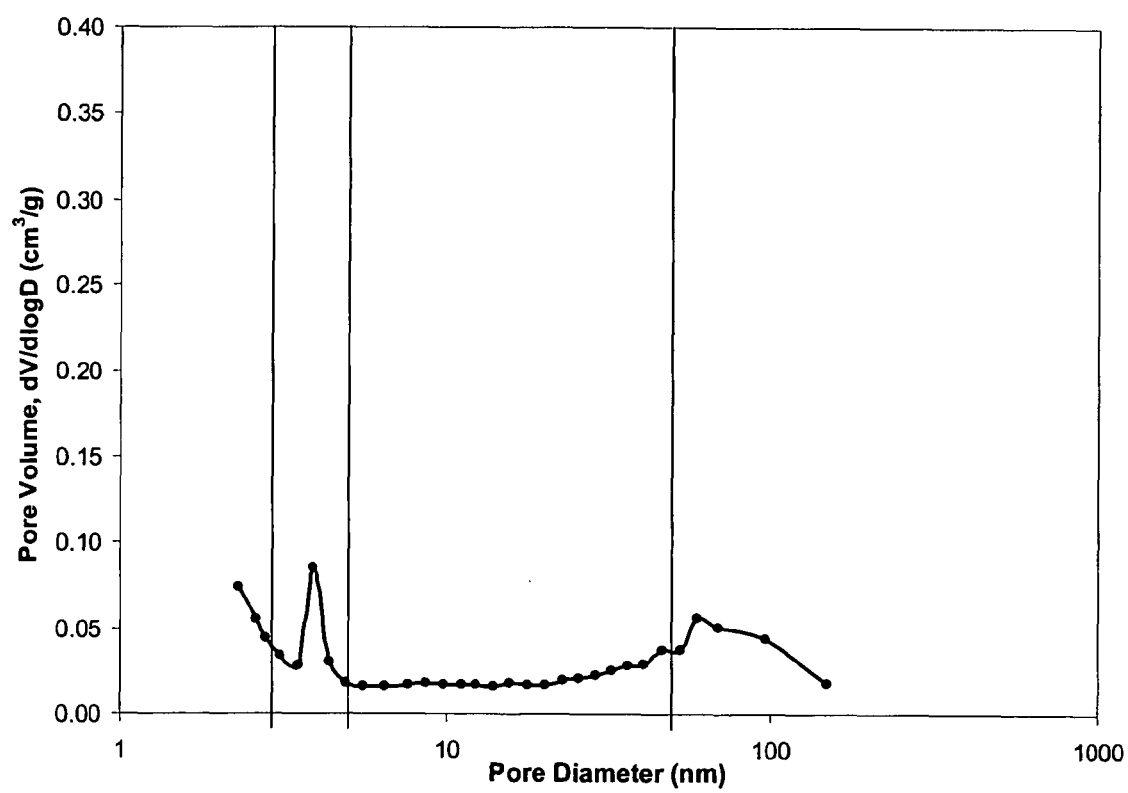
FIG. 5 is a BJH N₂ Desorption Plot of an EMY zeolite precursor.

Sample 3A is the starting Y zeolite (CBV-300®) precursor as in Examples 1 and 2. The BJH N$_2$ Desorption Plot for Sample 3A is shown in FIG. 5.

Figure 6:
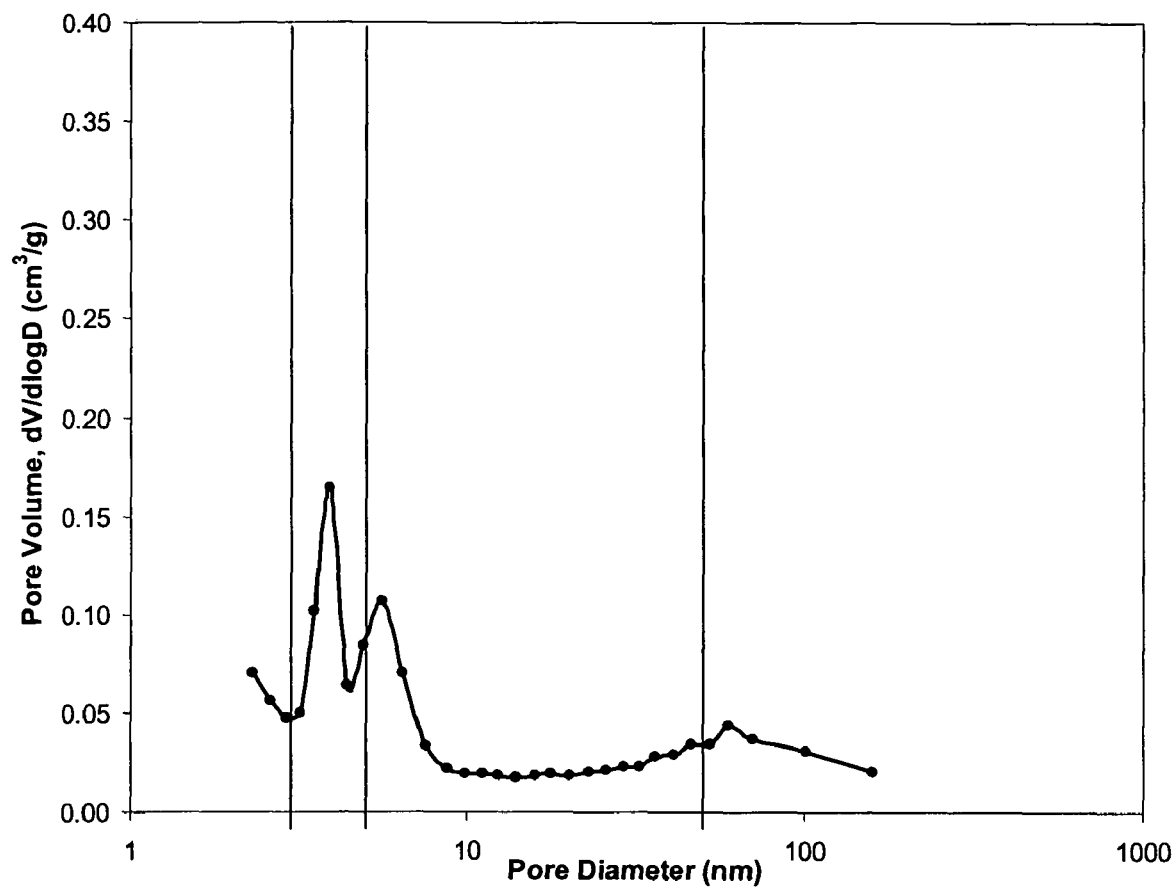
FIG. 6 is a BJH N₂ Desorption Plot of an EMY zeolite precursor that has been high temperature steam calcined at 1000° F. for 1 hour in 100% steam wherein the EMY zeolite precursor temperature during the high temperature steam calcination was raised to within 50° F. of the high temperature steam calcination temperature within 2 minutes.

Sample 3B was obtained by subjecting the starting Y zeolite precursor of Sample 3A to high temperature steam calcination at 1000° F. for 1 hour in 100% steam. The temperature during the high temperature steam calcination was raised to within 50° F. of the high temperature steam calcination temperature within 2 minutes. The BJH N$_2$ Desorption Plot for Sample 3B is shown in FIG. 6.

Figure 7:
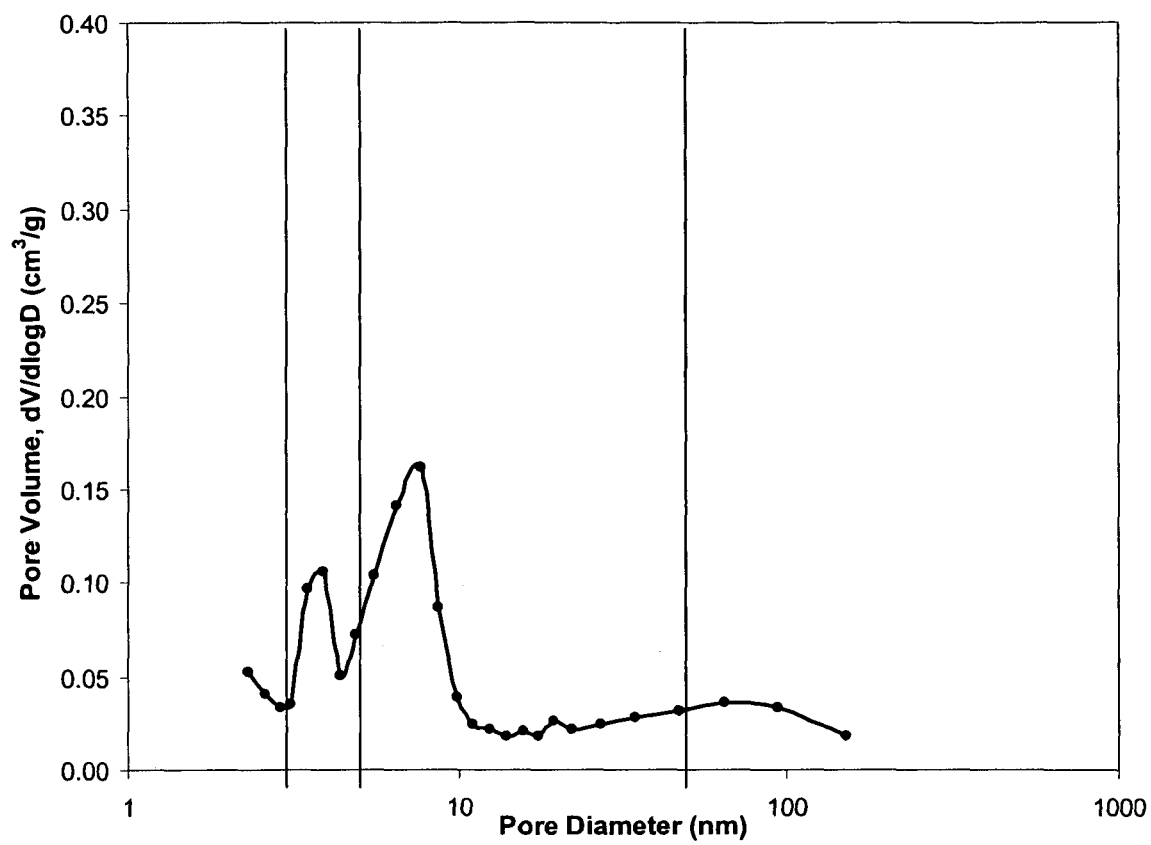
FIG. 7 is a BJH N₂ Desorption Plot of an EMY zeolite precursor that has been high temperature steam calcined at 1200° F. for 1 hour in 100% steam wherein the EMY zeolite precursor temperature during the high temperature steam calcination was raised to within 50° F. of the high temperature steam calcination temperature within 2 minutes.

Sample 3C was obtained by subjecting the starting Y zeolite precursor of Sample 3A to high temperature steam calcination at 1200° F. for 1 hour in 100% steam. The temperature during the high temperature steam calcination was raised to within 50° F. of the high temperature steam calcination temperature within 2 minutes. The BJH N$_2$ Desorption Plot for Sample 3C is shown in FIG. 7.

Figure 8:
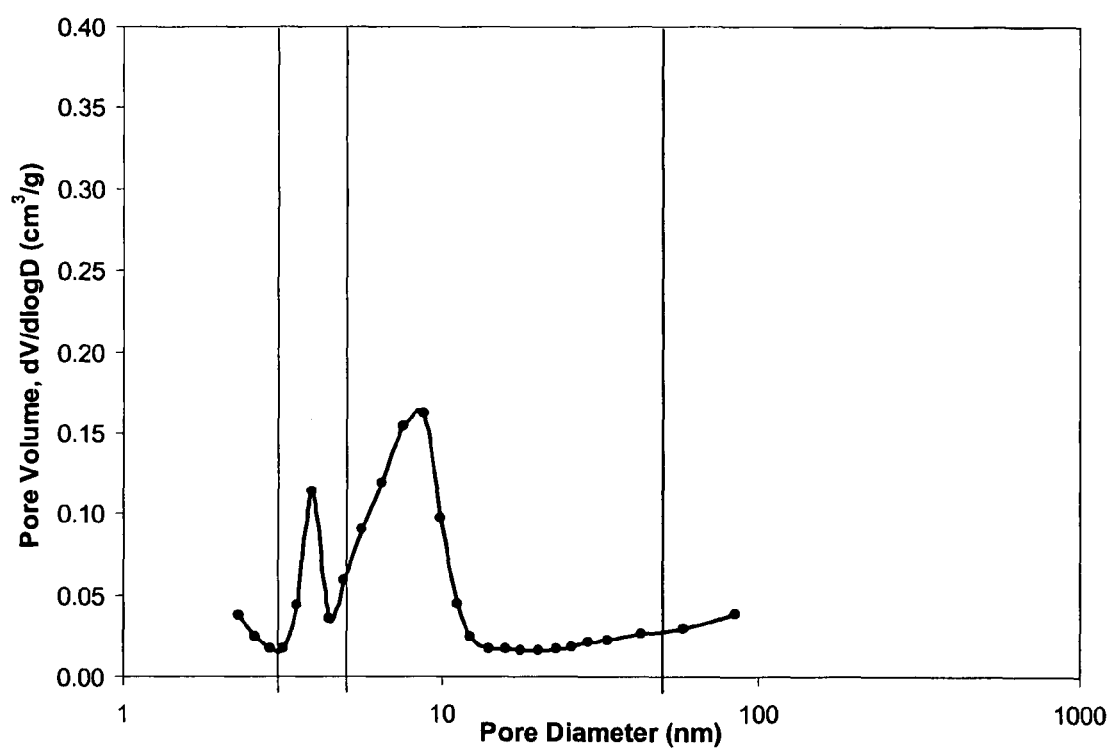
FIG. 8 is a BJH N₂ Desorption Plot of an EMY zeolite precursor that has been high temperature steam calcined at 1300° F. for 1 hour in 100% steam wherein the EMY zeolite precursor temperature during the high temperature steam calcination was raised to within 50° F. of the high temperature steam calcination temperature within 2 minutes.

Sample 3D was obtained by subjecting the starting Y zeolite precursor of Sample 3A to high temperature steam calcination at 1300° F. for 1 hour in 100% steam. The temperature during the high temperature steam calcination was raised to within 50° F. of the high temperature steam calcination temperature within 2 minutes. The BJH N$_2$ Desorption Plot for Sample 3D is shown in FIG. 8.

Figure 9:
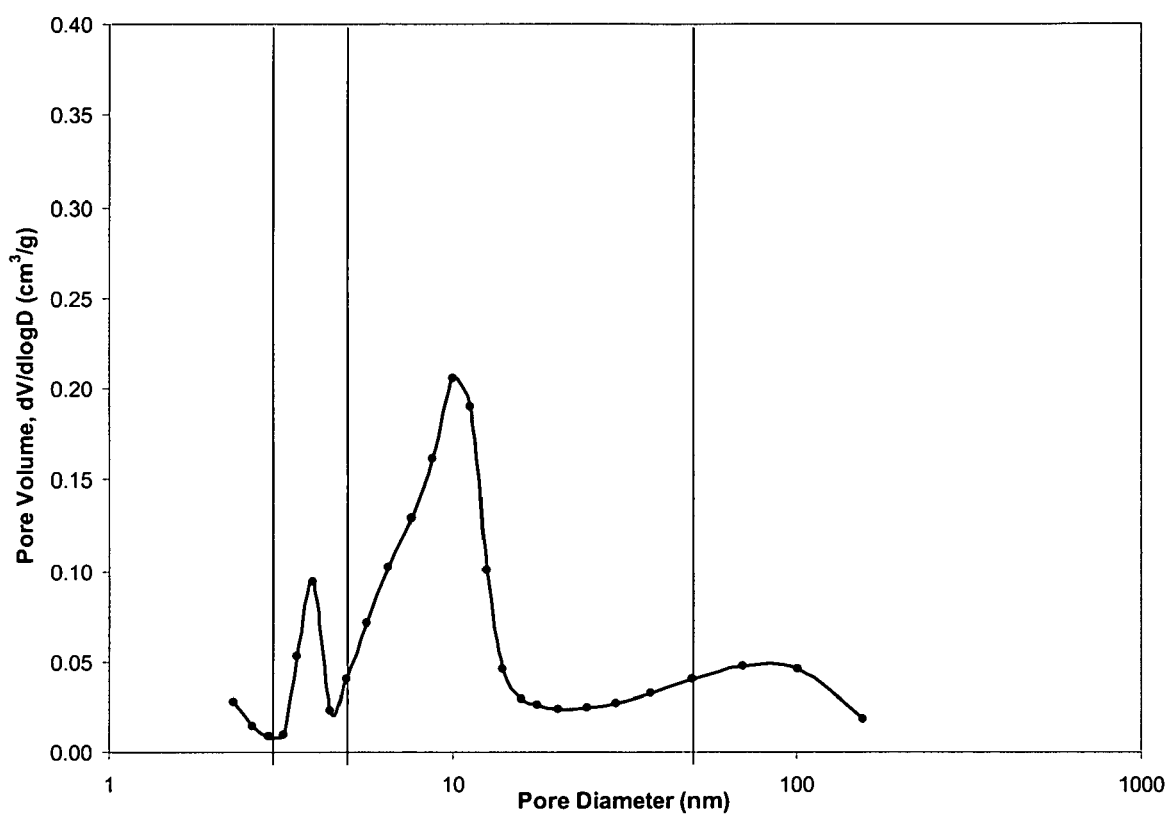
FIG. 9 is a BJH N₂ Desorption Plot of an EMY zeolite precursor that has been high temperature steam calcined at 1400° F. for 1 hour in 100% steam wherein the EMY zeolite precursor temperature during the high temperature steam calcination was raised to within 50° F. of the high temperature steam calcination temperature within 2 minutes.

Sample 3E was obtained by subjecting the starting Y zeolite precursor of Sample 3A to high temperature steam calcination at 1400° F. for 1 hour in 100% steam. The temperature during the high temperature steam calcination was raised to within 50° F. of the high temperature steam calcination temperature within 2 minutes. The BJH N$_2$ Desorption Plot for Sample 3E is shown in FIG. 9.

Sample 3F was obtained by subjecting the starting Y zeolite precursor of Sample 3A to high temperature steam calcination at 1500° F. for 1 hour in 100% steam. The temperature during the high temperature steam calcination was raised to within 50° F. of the high temperature steam calcination temperature within 2 minutes. The BJH N$_2$ Desorption Plot for Sample 3F is shown in FIG. 10.

The Small Mesoporous Volume (cm$^3$/g), the Large Mesoporous Volume (cm$^3$/g), the Small Mesopore Peak (cm$^3$/g), as well as the Large-to-Small Pore Volume Ratio ("LSPVR") for each of Samples 3A through 3F are shown in Table 3 herein. The BET surface area and Unit Cell Size are also shown in Table 3 for each of the Samples 3A through 3F.

As can be seen from FIG. 5 the zeolite Sample 3A (i.e., the starting ammonium-exchanged Y zeolite (CBV-300®)) had no appreciable peak associated with the large mesoporous pore range while exhibiting a Small Mesopore Peak of about 0.09 cm$^3$/g.

As can be seen from FIG. 6 the zeolite Sample 3B obtained after high temperature steam calcination of the starting ammonium-exchanged Y zeolite precursor exhibited only minor Large Mesopore Peak in the 50 to 500 Å pore diameter range, thereby resulting in a below desired Large-to-Small Pore Volume Ratio of about 1.58. Sample 3B did not quite develop into an EMY zeolite of the present invention, due to its slightly higher Small Mesopore Peak (about 0.16 cm$^3$/g) in the small mesoporous pore range (30 to 50 Å pore diameter range).

FIG. 7 shows the BJH N$_2$ Desorption Plot of Sample 3C. Here the characteristics of an EMY zeolite begin to develop wherein the obtained zeolite exhibits a significantly increased Large Mesopore Peak and an increased Large Mesopore Volume. Simultaneously, both the Small Mesopore Peak and the Small Mesopore Volume are decreased. The Large Mesopore Volume and the Small Mesopore Peak of Sample 3C were within the ranges of the EMY zeolite of the present invention.

FIG. 8 shows BJH N$_2$ Desorption Plot of Sample 3D. Here an EMY zeolite structure is developed with an increased Large Mesopore Peak and an increased Large Mesoporous Volume, with a simultaneous reduction of the Small Mesoporous Peak and the Small Mesopore Volume. The Large Mesopore Volume and the Small Mesopore Peak of Sample 3D were within the ranges of the EMY zeolite of the present invention. The Large Mesopore Volume and the Small Mesopore Peak of Sample 3D were within the ranges of the EMY zeolite of the present invention. Additionally, in this embodiment, the Large-to-Small Pore Volume Ratio increased significantly to within the desired preferred embodiment ranges of the EMY zeolite of the present invention.

FIG. 9 shows BJH N$_2$ Desorption Plot of Sample 3E which underwent a rapid rise high temperature steam calcination of 1400° F. for 1 hour. It can be seen that the EMY zeolite of Sample 3E exhibits a significantly improved pore structure with a Large-to-Small Pore Volume Ratio ("LSPVR") of about 7.58. As can be seen from the data in Table 3, Sample 3E has the largest LSPVR of all of the samples in this comparative example as well as the largest Large Pore Volume (0.0722 cm$^3$/g) of the acceptable EMY zeolites of this comparative example. Additionally, this EMY zeolite sample maintained a very low value of the Small Mesopore Peak of 0.09 cm$^3$/g. The Large Mesopore Volume and the Small Mesopore Peak of Sample 3E were within the ranges of the EMY zeolite of the present invention and this sample exhibited the most preferred overall characteristics of the EMY zeolite among the comparative samples.

In contrast to Samples 3C through 3E, the zeolite obtained in Sample 3F which was subjected to high temperature steam calcination of 1500° F. for 1 hour experienced significant degradation. The BJH N$_2$ Desorption Plot of Sample 3F is shown in FIG. 10. It can be seen from FIG. 10 as well as the data presented in Table 3, that while Sample 3F maintained a significant amount of Large Mesopore Volume, the Small Mesopore Peak of the zeolite obtained undesirably increased significantly to 0.21 cm$^3$/g. Thus, Sample 3F does not meet the necessary characteristics of the EMY zeolite. Therefore, it has been found that in preferred embodiments of the present invention, the EMY precursor is subjected to a high temperature steam calcination of less than about 1500° F. to obtain the EMY zeolite.

What is claimed is:

1. A method of making a Y zeolite, comprising:
    a) ammonium exchanging a Na—Y zeolite to obtain a zeolite precursor with a Na$_2$O content from about 2 to about 5 wt % on a dry basis; and
    b) subjecting the precursor to a high temperature steam calcination at a temperature from about 1200° F. to about 1500° F. wherein the temperature of the zeolite precursor is within 50° F. of the high temperature steam calcination temperature in less than 5 minutes;
    wherein the zeolite has a Large Mesopore Volume of at least about 0.03 cm$^3$/g, and a Small Mesopore Peak of less than about 0.15 cm$^3$/g.

2. The method of claim 1, wherein the zeolite precursor is rare earth exchanged prior to subjecting the zeolite precursor to high temperature steam calcination.

3. The method of claim 1, wherein the zeolite has a Large-to-Small Pore Volume Ratio of at least about 4.0.

4. The method of claim 1, wherein the Large Mesopore Volume of the zeolite and the Small Mesopore Peak of the zeolite are measured in the as-fabricated zeolite.

5. The method of claim 3, wherein the Large Mesopore Volume of the zeolite, the Small Mesopore Peak of the zeolite, and the Large-to-Small Pore Volume Ratio of the zeolite are measured in the as-fabricated zeolite.

6. The method of claim 1, wherein the zeolite has a unit cell size of about 24.37 Angstroms to about 24.47 Angstroms.

7. The method of claim 3, wherein the high temperature steam calcination is at a temperature from about 1250° F. to about 1450° F. and the temperature of the zeolite precursor is within a 50° F. of the high temperature steam calcination temperature in less than 2 minutes.

8. The method of claim 5, wherein the wherein $Na_2O$ content of the zeolite precursor is from about 2.3 to about 4 wt % on a dry basis.

9. The method of claim 1, wherein the zeolite has a Large-to-Small Pore Volume Ratio of at least about 5.0 and a Small Mesoporous Volume Peak of less than about 0.13 $cm^3/g$.

10. The method of claim 9, wherein the high temperature steam calcination is at a temperature from about 1250° F. to about 1450° F. and the temperature of the zeolite precursor is within a 50° F. of the high temperature steam calcination temperature in less than 2 minutes.

* * * * *